United States Patent Office 3,405,061
Patented Oct. 8, 1968

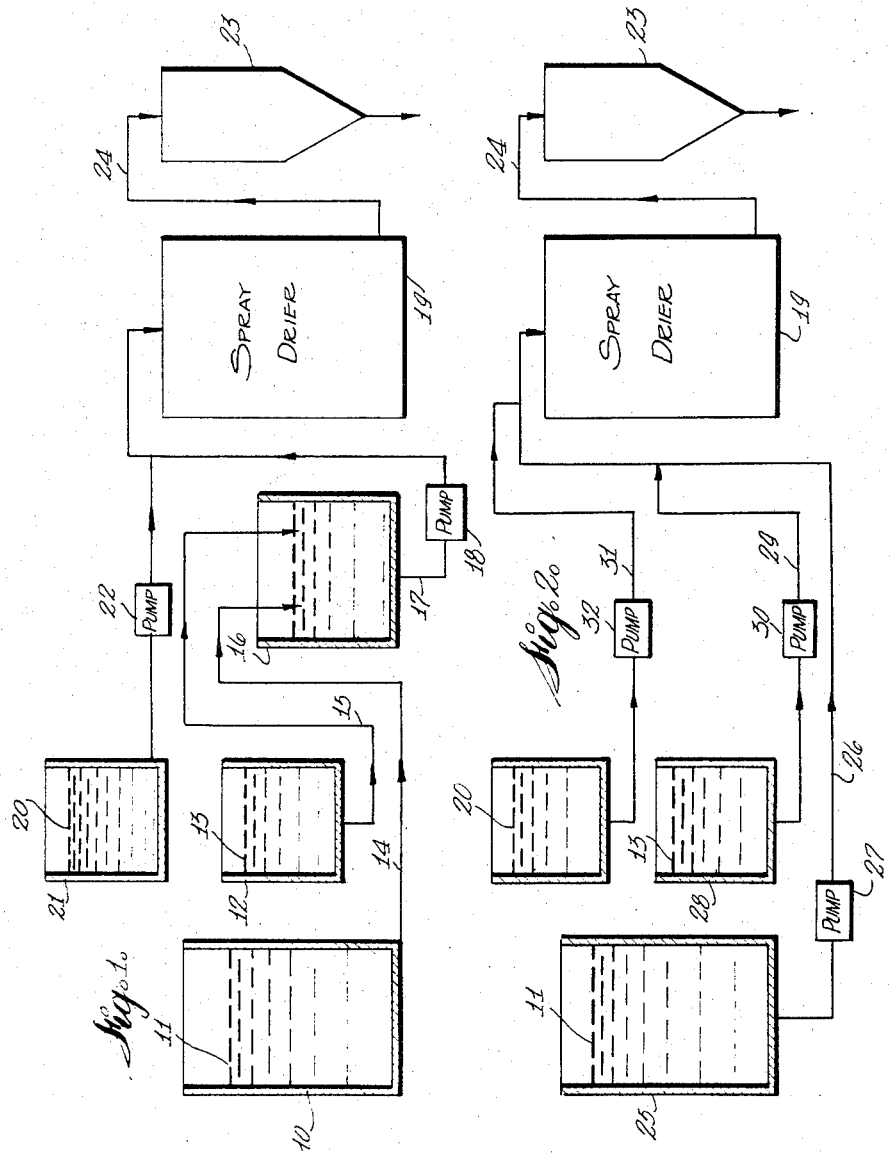

3,405,061
WELL DRILLING FLUIDS
Karl F. Keirstead and William E. Paton, Quebec City,
Quebec, Canada, assignors to Lignosol Chemicals
Limited, Quebec City, Quebec, Canada
Continuation-in-part of application Ser. No. 531,379,
Mar. 3, 1966. This application July 13, 1966, Ser.
No. 564,940
9 Claims. (Cl. 252—8.5)

This invention relates to a dispersant for aqueous clay slurries and to a well drilling fluid incorporating such dispersant. This application is a continuation-in-part of application Ser. No. 531,379, filed Mar. 3, 1966, now abandoned.

In the drilling of deep wells, as for example oil or gas wells, a drilling fluid or mud is usually used. This fluid, which is pumped down the inside of the drill pipe and returns upward in the annulus between the drill pipe and the hole, serves several purposes. It acts as a cooling medium and lubricant for the drill bit and as medium for the transport of drill cuttings to the surface, and it produces a sealing layer on the wall of the hole. The fluid normally consists of a suspension in water of a swelling of hydrateable clay, such as bentonite, together with such clay or finely divided material as may be produced from the soil in the course of drilling. Other materials may also be added, such as weighting materials where high pressures may be encountered, starches or gums to promote the wall sealing properties of the fluid, as well as a number of other materials which are used to produce fluids for use under special conditions.

Because of its function in removing the cuttings from the hole it is necessary that the viscosity of the fluid fall within a definite range. The viscosity of the fluid should be high enough to support the cuttings in their travel from the drill bit to the surface, but should not be so high as to make circulation difficult and develop unduly high pressures in the pumping system. At the same time the strength of the gel which develops on standing should be high enough to prevent settling of the cuttings in the well in the event that circulation should be stopped for any reason, but the gel should not develop fast enough to prevent settling and removal of the cuttings in the mud pit. Furthermore, the gel should not develop to a point where difficulties are encountered on the resumption of pumping.

Many attempts have been made in the past to achieve the desired mud characteristics as by adding a dispersant, conditioner or thinner to the aqueous clay slurry base to obtain satisfactory viscosity and gel strength. Dispersants containing lignin sulphonates produced from sulphite liquors have been proposed. However, optimum results using such dispersants are difficult to obtain in a uniform manner.

Sodium bentonite muds have little resistance to contamination by salt and anhydrite. Lime muds, produced by conversion of sodium bentonite to calcium bentonite, show some improvement in this respect. The conversion is carried out by the addition of sodium hydroxide and calcium hydroxide usually in proportion of about two to five pounds per barrel, respectively.

Lime muds have certain disadvantages where contamination is excessive and where high bottom temperatures are encountered. Lime muds normally show a pH of about 12.5 and are consequently subject to solidification at high temperatures. Under these circumstances, it is found desirable to use gypsum muds. These are prepared from sodium muds by the addition of three to five pounds per barrel of calcium sulphate with subsequent adjustment of the pH to a suitable range, usually 8 to 8.5.

Gypsum muds are little affected by anhydrite contamination since they are already saturated with respect to calcium sulphate. They are much more resistant to salt contamination and their lower pH makes them less subject to high temperature solidification. Gypsum muds, however, have been at a disadvantage in that high viscosities and gels have not responded satisfactorily to known lignosulphonate or other thinners.

An object of the present invention is to provide a dispersant for gypsum muds whereby satisfactory viscosities and gel strengths thereof may be maintained.

Another object is to provide a well drilling fluid of gypsum mud type having satisfactory viscosity and gel strength properties.

The present invention utilizes as the base material in the production of the dispersant a sodium base sulphite liquor.

It will be recognized that lignin sulphonates vary to an extremely wide degree in their chemical structure and no effective chemical designation has thus far been developed for identifying the various forms or classifications of these sulphonates. One reason for the lack of success in this regard is the great complexity of the molecule. Native lignins have molecular weights between 800 and 10,000. Another reason is the ease with which the molecule both degrades and polymerizes. Thus, after sulphite cooling, the lignin sulphonates have molecular weights ranging from a few thousands to 2,000,000.

It is well recognized that a lignin sulphonate cannot be described entirely in terms of a chemical composition but rather in terms of its process of production which determines its average physico-chemical structure and the properties of the product.

Since it is possible to prepare an indefinite number of lignin sulphonates having significant difference in physico-chemical properties by varying the starting material and/or process conditions, it is essential, for the purpose of the present invention, that a particular starting material be employed and that specified process conditions be observed.

The present invention resides in a dispersant for well drilling muds consisting essentially of dried lignin sulphonate obtained in the following manner. A sodium base sulphite liquor is heated in a closed zone at a temperature of 270–300° F., and the hot liquor is subjected to an oxidizing treatment of maximum degree by passing air into the liquor at a rate of about 0.5 to 1 cubic foot per minute per gallon of liquor for about 4 to 5 hours. The resulting liquor has a solids content of 40–45% and a pH of about 4–5.5. There is then added to the liquor, 15 to 30% of its solids content by weight of iron sulphate, and a substantially uniform mixture of the liquor and iron sulphate formed. After this uniform mixture is formed and without further additions of iron sulphate, 0.5 to 6% of the solids content of the mixture by weight of an alkali metal dichromate is added to the mixture, and a substantially uniform mixture of the liquor, iron sulphate and alkali metal dichromate formed. While temperature during these mixing steps may vary considerably, for practical purposes, this temperature will be in the range of 110–120° F. As quickly as possible after the addition of dichromate, and within three minutes thereof, the final mixture is dried to produce a dried product.

The invention also resides in a method of producing the dispersant set forth.

In the ensuing description, reference will be made to the accompanying drawings, in which FIGURE 1 is a block diagram of one form of apparatus for carrying out the invention, and FIGURE 2 is a block diagram of another form of apparatus for carrying out the invention.

It is quite important that the starting liquid be a sodium base sulphite liquor obtained in a somewhat similar manner to that disclosed in United States Patent 2,858,271. To this end, sodium base sulphite liquor is heated in a pressure vessel to a temperature of 270–300° F., by means of live steam or by means of a heat exchange coil. Air is admitted to the vessel through a sparger at the rate of about 0.5 to 1 cubic foot per minute per gallon of liquor to oxidize the material therein. A minimum reaction time of about 4 hours and preferably of about 5 hours is required for best results. The air oxidation treatment is thus carried out to maximum degree; that is, until no further improvement in properties takes place.

As previously indicated, it is important that the dispersant of the present invention have certain desired characteristics. The most important of these characteristics is unimpaired thinning properties. It is well recognized that temporary or permanent gel formation in the dispersant during its production will result in an impaired thinning property.

Viscosity is a factor in gel formation. A value, based upon viscosity, has been employed to determine quality of the dispersant produced in accordance with the invention. This value is determined by a viscosimeter test and related calculation.

It thus becomes highly important to observe certain conditions in order to produce a dispersant in which the tendency towards gel formation is substantially avoided.

The following factors must be observed in order to avoid undesirably high viscosity in the dispersant with resulting temporary, permanent, or partial gel formation:

(a) pH
(b) temperature
(c) presence of excess dichromate or iron sulphate
(d) concentration of the lignosulphonate and the dichromate
(e) speed and uniformity of mixing of the dichromate with the liquor
(f) order of the additions of iron sulphate and dichromate.

With respect to pH and temperature, it will be obvious that these factors will affect the rapidity of the reactions involved and may be employed to provide a means of control. The preferred pH range of the present invention is 4 to 5.5. A pH of 3 or less would be quite unsuitable. Temperature is subject to ready control and will depend to some extent on other operating conditions. A satisfactory operating temperature is, as previously indicated, 110° to 120° F.

Use of more than 6% dichromate is not only uneconomical but it results in difficulties in controlling the tendency towards gel formation. A satisfactory range of dichromate addition, based upon the weight of solids in the liquor is, 0.5% to about 6%. A preferred amount is about 3% (2–4%). Tests have shown that additions of, say, 10% dichromate produce a drastic deterioration in thinning properties.

The iron sulphate addition, also based on the weight of solids in the liquor, may vary from 15 to 30%. The specific amount of iron sulphate is not nearly as critical as that of the dichromate.

It is quite important that the iron sulphate and dichromate be separately added to the liquor and that the iron sulphate be completely added to the liquor before addition of the dichromate. If the dichromate were added before the iron sulphate, a product having different and undesirable properties would result.

The concentration of lignosulphonate solids in the liquor is another important characteristic. The desirable range of solids in the liquor is 40 to 45%, the optimum range being 40–42%. If the solids content is increased beyond 45%, adjustment of operating conditions to compensate for the increased solids becomes difficult and, of course, pumping of such a liquor is not as convenient.

An important factor resides in the requirement that thorough and uniform mixing be effected as rapidly as possible during the addition of the dichromate. Obviously when a solution of dichromate is added in a stream to a stirred volume of oxidized sulphite liquor in a tank there will be a temporary high concentration of dichromate which will persist until equilibrium is reached. As previously indicated, a high concentration of dichromate in a localized area of the liquor will result in gel clot formations which should be avoided.

Another important requirement is that undesirable side reactions must be prevented if required quality is to be achieved. To this end, it is essential that drying of the treated liquor be effected as quickly as possible following the addition of the dichromate. Thus, the mixture should be completely dried within three minutes of the addition of dichromate.

The drawings illustrate diagrammatically two satisfactory types of apparatus for carrying out the invention.

Referring to FIGURE 1, 10 is a supply tank containing liquor 11 and 12 is a supply tank containing iron sulphate solution 13. The liquor and iron sulphate solution are fed through respective supply lines 14, 15 to a mixing tank 16. The mixture from tank 16 is fed through a line 17 by means of pump 18 to a conventional spray drier 19. The "hold-up" time, that is, the time delay between the formation of the mixture in tank 16 and its supply to the drier is about 1 to 12 hours. The reason for this time delay is that the mixture is formed in tank 16 by a batch procedure.

The chromate solution 20 is contained in a tank 21 and is fed to line 17 by means of pump 22 just prior to its connection with the drier. Injection of the chromate solution into the confined flowing stream of mixture of liquor and iron sulphate in line 17 results in thorough and uniform mixing of the dichromate solution therewith. The "hold-up" time of the dichromate solution, that is; the time delay between its addition to the mixture and the supply of the resulting mixture to the drier is no greater than three minutes and is usually less than one minute.

Following drying, the product is fed to a hopper 23 through line 24.

Referring to FIGURE 2, a substantially continuous form of operation is therein illustrated. The liquor 11 from supply tank 25 is fed to the spray drier 19 through a line 26 by means of pump 27. Iron sulphate solution 13 from supply tank 28 is fed to line 26 through a line 29 by means of pump 30. Dichromate solution 20 is fed to line 26 through a line 31 by means of pump 32 at a point downstream of the point of entrance of the iron sulphate solution to the line. These points are spaced a sufficient distance to provide substantially effective incorporation of the iron sulphate solution in the liquor prior to entrance of the dichromate solution into the mixture. Thus, for instance, using a 2 inch pipe for line 26, the point of entry for the iron sulphate solution may be satisfactorily about 20 feet from the point of entry of the dichromate solution, and the point of entry of the dichromate solution may be satisfactorily about 10 feet from the entry nozzle of the drier.

It will be appreciated that the continuous system of FIGURE 2 makes possible fully accurately proportioned additions of iron sulphate annd dichromate and the resulting product is of superior and uniform quality.

The batch system of FIGURE 1, while it does not provide the accurate proportioning of the continuous system, results in a quite satisfactory product. Moreover, the batch system has the advantage of simplicity of practical operation.

The importance of adding the iron sulphate to the liquor firstly with subsequent addition of the dichromate and prompt drying thereafter has been previously stressed. The following table gives comparative characteristics of (1) a product wherein the dichromate is added first, the iron sulphate added about 20 minutes later, and drying effected thereafter within one minute, and (2) a product prepared in accordance with the invention wherein the iron sulphate is added first, the dichromate added about 20 minutes later, and drying effected thereafter within one minute.

TABLE I

|  | Viscosity | | Plastic viscosity | Yield point | Gels | Fluid loss, ml. |
| --- | --- | --- | --- | --- | --- | --- |
|  | 600 | 300 | | | | |
| (1) | 60 | 38 | 22 | 16 | 8–127 | 10.5 |
| (2) | 45 | 28 | 17 | 11 | 7–84 | 13.8 |

It should be mentioned that fluid loss is not considered to be of critical importance because it can be controlled in the field by useing an excess of dispersant or by the addition of starch, carboxylmethyl cellulose or other fluid loss control agents.

The product of the present invention has a molecular weight (75% of solids) in the range of 8000–13,000, and an equivalent weight of less than 300. These factors are quite important since solubility is a function of molecular weight. Moreover, a low equivalent weight means that more functional acid groups are present. It is a generally accepted principle that the efficiency of a lignosulphonate is improved by increasing the number of functional groups.

The dispersant is mixed with a gypsum clay slurry in proportions of 2 to 3 pounds per barrel to constitute the drilling fluid.

The following comparative tests illustrate the effectiveness of the addition of iron sulphate to the fluid.

300 gallons of evaporated sodium sulphite liquor having a solids content of 50% were treated, as above described, at a temperature of 295° F. with live steam. Air was admitted at the rate of 150 cubic feet per minute (in terms of air at atmospheric pressure) and the treatmet continued for 2 hours at this temperature. After removal from the autoclave, sodium bichromate and ferrous sulphate were added to give 3% sodium bichromate and 18% ferrous sulphate measured on the total weight of the material at 40% solids. Measurements of the dispersing properties of the material were now carried out on gypsum drilling mud. A synthetic drilling mud was prepared by making up a 7% slurry of bentonite which, after aging overnight showed the following properties immediately after vigorous agitation.

| | |
| --- | --- |
| Viscosity | 14 |
| 0 gel | 0 |
| 10 min. gel | 40 |
| pH | 8.9 |
| Filter loss cc | 12.0 |

The stock mud was divided into 350 cc. portions and to each was added 3 grams (equivalent to 3 pounds per barrel) of the dispersant at each stage of its manufacture. After agitation, 3 grams of calcium sulphate were added and the pH adjusted to 8.5. Viscosities and gel strengths were then measured, in accordance with the standard method of the American Petroleum Institute. The results are shown in the following table:

TABLE II

| Dispersant | Viscosity | Gel 0–10 min. |
| --- | --- | --- |
| (1) None | | (¹) |
| (2) Sodium base sulphite liquor solids | 35 | 15–50 |
| (3) Sodium base sulphite liquor solids +3% Na₂Cr₂O₇ | 32 | 10–50 |
| (4) Sodium base sulphite liquor solids +18% FeSO₄ | 44 | 10–40 |
| (5) Sodium base sulphite liquor solids +3% Na₂Cr₂O₇ +18% FeSO₄ | 32 | 5–60 |
| (6) Sodium base sulphite liquor solids air treated 2 hours | 35 | 10–50 |
| (7) Sodium base sulphite liquor solids air treated 2 hours +3% Na₂Cr₂O₇ | 32 | 5–40 |
| (8) Sodium base sulphite liquor solids air treated 2 hours +3% Na₂Cr₂O₇ +18% FeSO₄ | 20 | 0–30 |
| (9) Sodium base sulphite liquor solids air treated 2 hours +3% Na₂Cr₂O₇ +18% FeSO₄ spray dried | 20 | 0–30 |

¹ Gelled completely.

The following comparison tests are illustrative of improved results flowing from use of a sodium base liquor in accordance with the invention over the use of a calcium base liquor, the tests being conducted in gyp muds comprising 10 parts Tennessee Ball Clay, 4 parts Dixie Bond Clay, and 1 part commercial Wyoming bentonite, made up as a 34% slurry.

TABLE III (The air oxidation (4 hours) being effected after addition of 5% $Na_2Cr_2O_7 \cdot 2H_2O$ and 12% $FeSO_4 \cdot 7H_2O$),

| | Filter loss | Viscosity | Gels 0–10 min. |
| --- | --- | --- | --- |
| Sodium base | 24.5 | 77 | 44–33 |
| Calcium base | 26.0 | 90 | 48–31 |

TABLE IV (The air oxidation (4 hours) being followed by addition of 5% $Na_2Cr_2O_7 \cdot 2H_2O$ and 12% $FeSO_4 \cdot 7H_2O$),

| | Filter loss | Viscosity | Gels 0–10 min. |
| --- | --- | --- | --- |
| Sodium base | 25.0 | 77 | 48–34 |
| Calcium base | 30.0 | 93 | 61–49 |

We claim:
1. A dispersant for well drilling muds consisting essentially of dried lignin sulphonate obtained by the following steps:
   (a) heating sodium base sulphite liquor in a closed zone at a temperature of about 270° to 300° F.,
   (b) passing air into said hot liquor at a rate of about 0.5 to 1 cubic foot per minute per gallon of liquor for about 4 to 5 hours to oxidize the material therein to maximum degree,
   (c) providing a body of said liquor having a solids content of 40–45%,
   (d) adding to said body of liquor 15 to 30% of its solids content by weight of iron sulphate, and forming a substantially uniform mixture of said liquor and iron sulphate,
   (e) following completion of said iron sulphate addition and said mixture formation and within about one to twelve hours thereafter adding to said mixture 0.5 to 6% of its solids content by weight of an alkali metal dichromate and forming a substantially uniform mixture of said dichromate, iron sulphate, and liquor, and
   (f) within a period not substantially exceeding three minutes after said addition of alkali metal dichromate drying said last-mentioned mixture.

2. A dispersant as defined in claim 1, wherein said solids content of said body of liquor is 40–42%.

3. A dispersant as defined in claim 1, wherein the amount of said alkali metal dichromate added to said body of liquor is about 3% of the solids content by weight of said body.

4. A dispersant as defined in claim 1, said dried mixture having a molecular weight of 8000–13,000 and an equivalent weight of less than 300.

5. A dispersant as defined in claim 1, wherein said body of liquor has a pH of about 4–5.5.

6. A dispersant as defined in claim 5, wherein said body of liquor has a temperature of about 110–120° F. during the performance of steps (d) and (e).

7. A well drilling fluid consisting essentially of an aqueous slurry of sodium bentonite containing gypsum and 2 to 3 pounds per barrel of a dispersant consisting essentially of dried lignin sulphonate obtained by the following steps:
   (a) heating sodium base sulphite liquor in a closed zone at a temperature of about 270° to 300° F.,
   (b) passing air into said hot liquor at a rate of about 0.5 to 1 cubic foot per minute per gallon of liquor for about 4 to 5 hours to oxidize the material therein to maximum degree,
   (c) providing a body of said liquor having a solids content of 40–45%, (d) adding to said body of liquor 15 to 30% of its solids content by weight of iron sulphate, and forming a substantially uniform mixture of said liquor and iron sulphate, (e) following completion of said iron sulphate addition and said mixture formation and within about one to twelve hours thereafter adding to said mixture 0.5 to 6% of its solids content by weight of an alkali metal dichromate, and forming a substantially uniform mixture of said dichromate, iron sulphate, and liquor, and (f) within a period not substantially exceeding three minutes after said addition of alkali metal dichromate, drying said last-mentioned mixture.

8. A well drilling fluid as defined in claim 7, wherein said gypsum comprises calcium sulphate in the proportion of 3 to 5 pounds per barrel of slurry.

9. A method of preparing a dispersant for well drilling muds which comprises,
 (a) heating sodium base sulphite liquor in a closed zone at a temperature of 270–300° F.,
 (b) passing air into said hot liquor at the rate of about 0.5 to 1 cubic foot per minute per gallon of liquor for about 4 to 5 hours to oxidize the material therein to maximum degree,
 (c) providing a body of said liquor having a solids content of 40–45%,
 (d) adding to said body of liquor 15 to 30% of its solids content by weight of iron sulphate, and forming a substantially uniform mixture of said liquor and iron sulphate,
 (e) following completion of said iron sulphate addition and said mixture formation and within about one to twelve hours thereafter adding to said mixture 0.5 to 6% of its solids content by weight of an alkali metal dichromate, and forming a substantially uniform mixture of said dichromate, iron sulphate, and liquor, and
 (f) within a period not substantially exceeding three minutes after said addition of alkali metal dichromate drying said last-mentioned mixture.

References Cited
UNITED STATES PATENTS

| | | | |
|---|---|---|---|
| 2,605,221 | 7/1952 | Hoeppel | 252—8.5 |
| 2,858,271 | 10/1958 | Byrd | 252—8.5 |
| 2,901,429 | 8/1959 | Russell et al. | 252—8.5 |
| 2,935,473 | 5/1960 | King et al. | 252—8.5 |
| 2,935,504 | 5/1960 | King et al. | 252—8.5 |
| 3,009,874 | 11/1961 | Chisholm | 252—8.5 |

LEON D. ROSDOL, *Primary Examiner.*

H. B. GUYNN, *Assistant Examiner.*